Jan. 11, 1927. 1,614,268
J. H. WILSON
WIND DRIVEN MOTOR
Filed March 30, 1925   3 Sheets-Sheet 1

Inventor
J. H. Wilson
By _____ Attorney

Jan. 11, 1927.  
J. H. WILSON  
WIND DRIVEN MOTOR  
Filed March 30, 1925   3 Sheets-Sheet 2
1,614,268
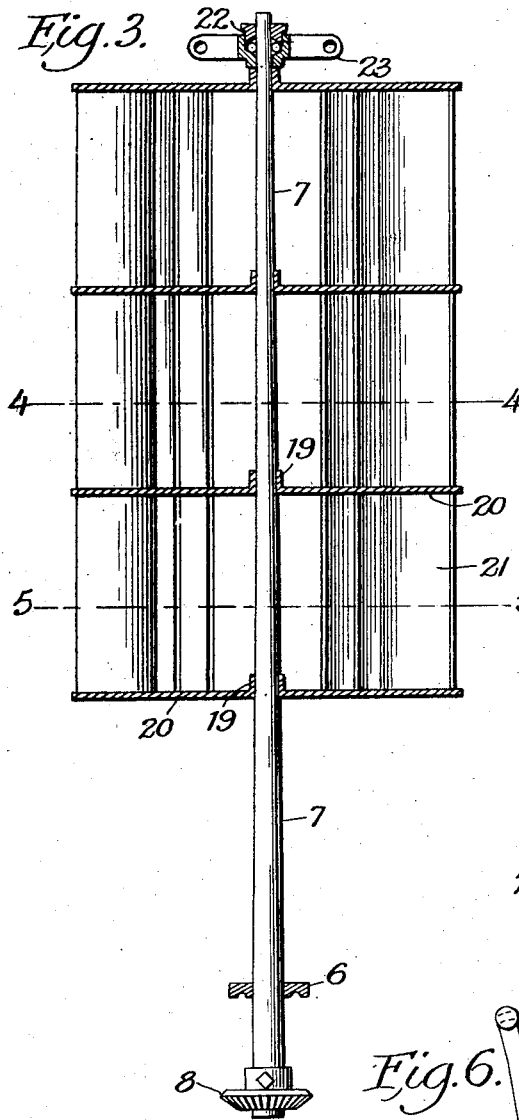
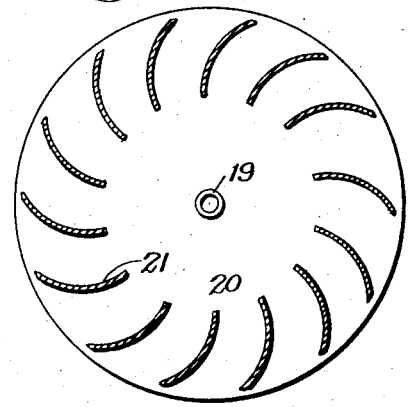
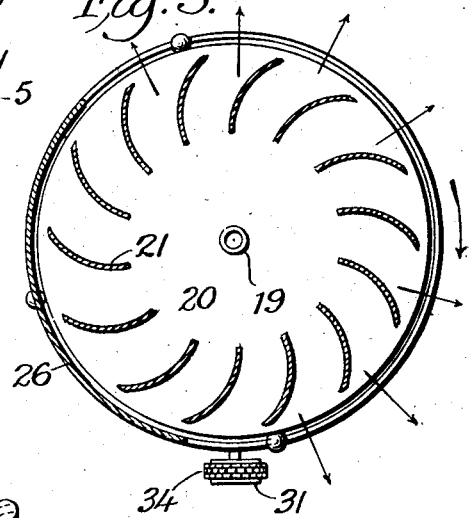
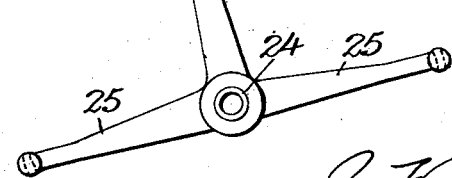

Jan. 11, 1927.  J. H. WILSON  1,614,268
WIND DRIVEN MOTOR
Filed March 30, 1925    3 Sheets-Sheet 3
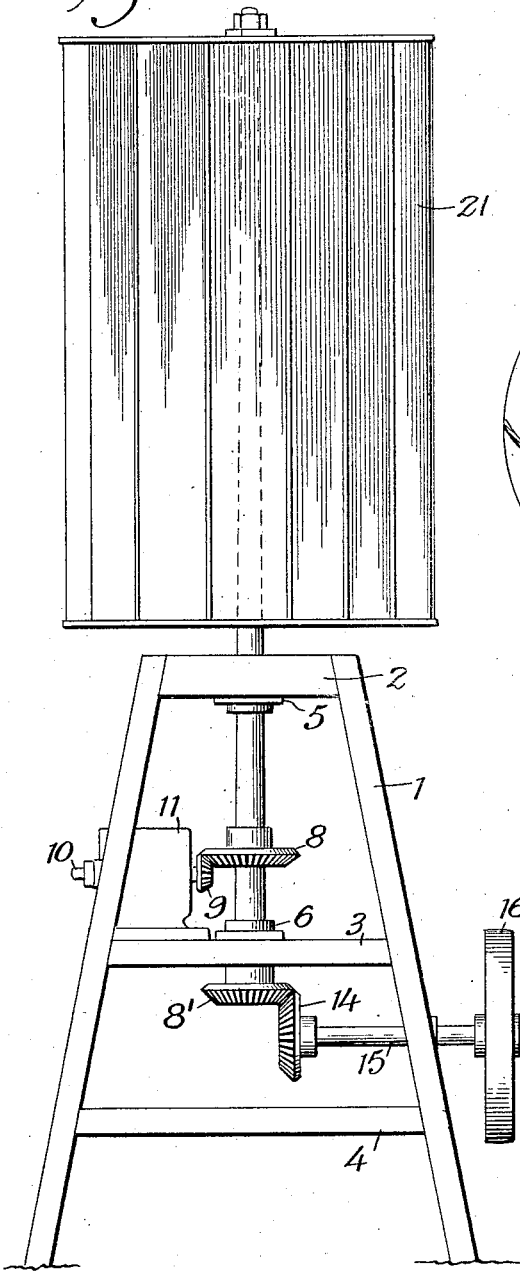
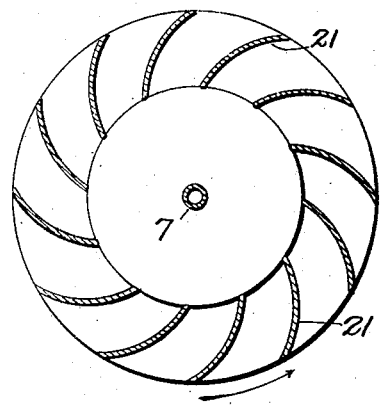

Patented Jan. 11, 1927.

1,614,268

UNITED STATES PATENT OFFICE.

JOHN HOLMES WILSON, OF MIDDLESEX TOWNSHIP, CUMBERLAND COUNTY, PENNSYLVANIA.

WIND-DRIVEN MOTOR.

Application filed March 30, 1925. Serial No. 19,319.

My invention relates to improvements in propellers and wind-driven motors and the main object of my invention is the provision of a mechanism which will utilize the force of the wind for driving either simultaneously or separately a dynamo or pulley-driven means, thereby producing a motor capable of many and varied uses.

Another object of my invention is the provision of a wind-driven motor which can be constructed at a low price to make its use practical and desirable, and which will be simple and durable of construction and capable of withstanding hard service.
Another object of my invention is the provision of a motor of this character which will be of compact and small size when its motor capacity is considered and which will commend itself as thoroughly practical from every point of view, and with the addition of certain details may be transformed into an air propeller for moving objects through the air or on water or land.

To attain the desired objects, my invention consists of a wind-driven motor embodying novel features of construction and combination of parts, substantially as described and defined by the claim, and as shown in the accompanying drawings, in which:

Fig. 3 represents a vertical central sectional view of the propeller or driving unit of my invention, the vertical conical driving shaft being shown in elevation.
Fig. 4 represents a view on line 4—4 of Fig. 3.

Fig. 5 represents a view on line 5—5 of Fig. 3, and

Fig. 6 represents a detail view of the free arm frame or spider employed in my invention.

Figs. 7 and 8 show the adaptation of the device as a motor alone.

Referring by numeral to the drawings in which the same numerals of reference are used to denote like parts in all the views of the drawings:

Figure 1:
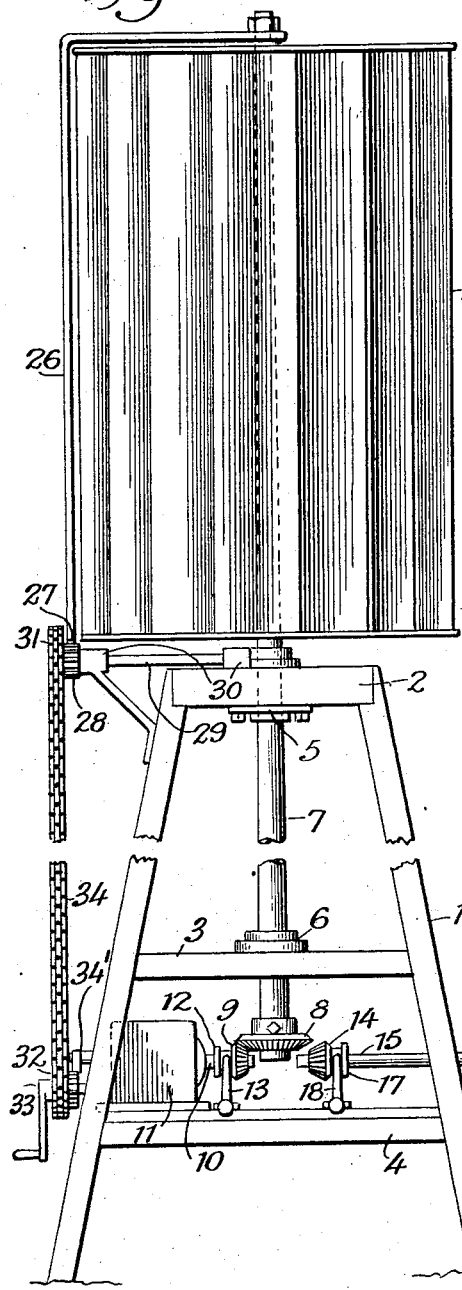
Figure 1 represents a side elevation of a wind-driven motor constructed in accordance with and embodying my invention.

The numeral 1 designates the tower or support of my invention which is of the desired height to suit condition and circumstances and consists of the corner posts connected by the top frame 2, the intermediate frame 3 and the lower frame 4, the intermediate frame 3 and the top frame 2 being provided with suitable bearings 5 and 6, for the tapered driving shaft 7, which has its lower end pass through and below the intermediate frame 3, and carries a bevelled driving pinion 8, adapted to mesh with the bevelled pinion 9, on shaft 10 of the dynamo 11, and capable of being thrown into or out of mesh by means of the collar 12 and shifting lever 13, while the bevelled pinion 14, on shaft 15 carrying pulley 16, is adapted to be thrown into or out of mesh with driving pinion 9, by means of sliding collar 17 and shifting lever mechanism 18.

From this construction it will be observed that the tapered vertical driving shaft is mounted for rotation in the tower frame and that its driving pinion 9 is capable of operating simultaneously or individually the dynamo or the pulley carrying shaft, by means of the pair of pulleys and the manually operated shifting mechanism and the upper portion of the driving shaft extends above the frame or tower and has mounted thereon the conical hubs 19, of the disks 20 of the propelling member, which is also provided with a series of curved blades which permit the entrance of the wind and serve to trap the wind and utilize its force to impinge against the blades 21 and drive the wheel or propelling member in a very rapid manner, the upper end of the driving shaft being mounted in ball bearings 22, one member of which is formed with arms 23, which receive brace wires, if found necessary.

Figure 2:
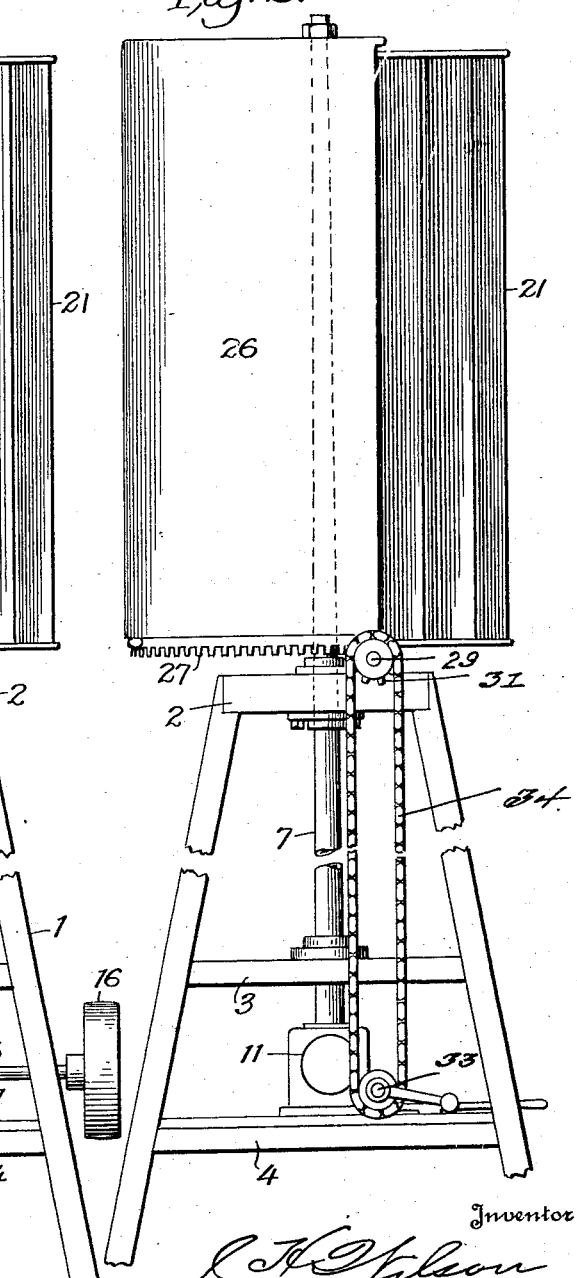
Fig. 2 represents a similar view taken at right-angles to Fig. 1.

The above description applies to the device when used as a motor when elevated in the air to act freely, but when it is desired to use same device as a propeller for use on a vehicle, boat or other moving object, certain additions are made as shown in Figs. 1, 2, 5 and 6, and where mounted to move around the shaft 7 is a hub 24, with radiating arms 25 carrying an arc-shaped rack 27 at the lower edge of a hood or shield 26 adapted to cover about one-third of the side or area of the structure comprising the motor or propeller, so that the blades 21 will catch the air in the direction shown by the arrows and draw the said vehicle or boat in the direction of the open side.

It will thus be seen that the device as shown in Figs. 3, 4, 7 and 8 is adapted solely for motive purposes and to impart power to the dynamo or the pulley 16, or to both simultaneously as shown in Fig. 7 or the two may be separated by the clutches 13 and 18 to be worked independently, when the dynamo may be displaced for a motor to drive the propeller.

In locating the latter on a moving object it is preferable to mount it in a vertical position and to locate bare blades on the side in the direction of movement so that the action of said blades 21 may draw the air backward and the vehicle boat forward.

By this means if it is necessary to carry power to a certain point the propeller may be utilized as above described and on arrival at its destination the electric motor may be detached and the hood 26 thrown to the side where it will not obstruct the wind, and the device used to rotate the pulley 16 or the armature of a dynamo.

As shown by arrows in Figs. 5 and 8 it will be seen that the two devices are adapted to rotate in opposite directions in performing their functions.

From the foregoing description taken in connection with the drawing the operation of my invention will be apparent and further elaboration is deemed unnecessary, and it will be noted that the hood is rotated to the proper position to admit the full force of the wind to the propelling member or wheel and that the rotation thereof rapidly rotates the driving shaft, which by reason of its driving gear will operate the dynamo or the pulley carrying shaft either in unison or separately, and thus a motor which can be operated very cheaply and produce a great amount of power is provided.

The conical or tapered shape of the driving shaft is important in that the hubs of the propelling wheel have a wedging connection with the shaft and are thus securely retained upon the shaft and cannot possibly work loose.

The advantages of my motor will be readily understood and it will be evident that a motor constructed according to my invention can be cheaply and quickly constructed; can be operated at small expense to produce a great amount of power; is of simple and durable construction to withstand hard service, and generally is useful efficient and practical in every particular.

I claim:

In an air motor, the combination of a vertical tapering shaft turning in ball bearings, a series of wheels spaced apart and secured to said shaft, curved air vanes arranged and secured between said wheels on shaft, and ball bearing means for supporting said vertical shaft at its greatest vertical height.

In testimony whereof I hereunto affix my signature.

JOHN HOLMES WILSON.